(12) United States Patent
Hsieh et al.

(10) Patent No.: US 7,412,759 B1
(45) Date of Patent: Aug. 19, 2008

(54) TELESCOPIC SAFETY SHIELD FOR MACHINE TOOL

(75) Inventors: Tom Hsieh, Nantou Hsien (TW); Gary Lin, Nantou Hsien (TW)

(73) Assignee: Hardinge Taiwan Precision Machine Ltd., Nantou, Nantou Hsien (TW)

( * ) Notice: Subject to any disclaimer, the term of this patent is extended or adjusted under 35 U.S.C. 154(b) by 0 days.

(21) Appl. No.: 11/789,248

(22) Filed: Apr. 24, 2007

(51) Int. Cl.
*B23P 23/00* (2006.01)
*B23C 1/00* (2006.01)

(52) U.S. Cl. .......................... 29/27 C; 29/27 R; 29/40; 82/117; 82/106; 82/159; 409/200; 409/235; 220/8; 160/202; 52/67

(58) Field of Classification Search ............... 29/27 C, 29/27 R, 564, 36, 40, 50; 82/106, 117, 120, 82/121, 137, 138, 149, 159, 161, 157; 409/134, 409/166, 165, 200, 201, 203, 231, 235; 108/147.19; 220/8; 52/67; 160/202, 211, 223; 464/172
See application file for complete search history.

(56) References Cited

U.S. PATENT DOCUMENTS

| | | | |
|---|---|---|---|
| 3,785,418 A | 1/1974 | Henning et al. | 150/52 R |
| 4,482,043 A * | 11/1984 | Bauman et al. | 29/33 P |
| 4,635,699 A | 1/1987 | Kauffman et al. | 160/211 |
| 4,722,452 A * | 2/1988 | Hennig et al. | 220/8 |
| 4,950,113 A * | 8/1990 | Winkler et al. | 409/134 |
| 5,127,140 A | 7/1992 | Oiwa et al. | 29/27 C |
| 5,199,926 A | 4/1993 | Hennig et al. | 464/170 |
| 5,293,793 A * | 3/1994 | Hessbruggen et al. | 82/121 |
| 5,624,363 A * | 4/1997 | Kuriki | 409/134 |
| 6,080,039 A * | 6/2000 | Bartlett et al. | 409/159 |
| 6,446,397 B1* | 9/2002 | O'Connor et al. | 409/134 |
| 6,749,495 B2* | 6/2004 | Grund et al. | 409/134 |
| 7,179,029 B2* | 2/2007 | Hemming et al. | 409/200 |
| 7,192,225 B2* | 3/2007 | Takayama et al. | 409/134 |
| 7,261,501 B2* | 8/2007 | Condrau et al. | 409/134 |
| 2002/0077052 A1* | 6/2002 | Grund et al. | 451/451 |

* cited by examiner

*Primary Examiner*—Dana Ross
(74) *Attorney, Agent, or Firm*—Charles E. Baxley

(57) ABSTRACT

A telescopic safety shield device includes a carrier movably engaged onto a platform and having one or more guideways tilted relative to the platform, a tool rest movably engaged onto the guideways and moveable inclinedly relative to the carrier and the platform, and a telescopic shielding device having two or more casing members coupled between the platform and the tool rest for shielding the area between the platform and the tool rest, the casing members are pivotally coupled to the platform and the tool rest for allowing the casing members to be pivoted relative to the platform and the tool rest respectively and for preventing dirt or contaminant from entering into the areas between the platform and the tool rest.

15 Claims, 5 Drawing Sheets

TELESCOPIC SAFETY SHIELD FOR MACHINE TOOL

BACKGROUND OF THE INVENTION

1. Field of the Invention

The present invention relates to a telescopic safety shield or retractable safety cover, and more particularly to a telescopic safety shield for attaching between two movable members or parts of a machine tool and for suitably shielding and covering the areas between the movable members or parts of the machine tool and for preventing dirt or contaminant from entering into the areas between the movable members or parts of the machine tool.

2. Description of the Prior Art

Typical telescopic safety shields or retractable safety covers comprise a number of retractable or telescopic cover elements movable relative to each other for attaching to a machine tool and for suitably shielding and covering the exposing areas of the machine tool and for preventing dirt or contaminant from entering into the exposing areas of the machine tool and thus for protecting the machine tool from being damaged by the dirt or contaminant or chips cut off by the machine tool.

For example, U.S. Pat. No. 3,785,418 to Hennig et al. discloses one of the typical covers for machine tools also comprising a number of retractable or telescopic cover elements movably or retractably or foldably attached to a guideway of a machine tool and for suitably shielding and covering the guideway of the machine tool and for preventing dirt or contaminant from entering into the guideway and thus for protecting the machine tool from being damaged by the dirt or contaminant or chips cut off by the machine tool.

However, the guideway is moved only in one way or in one direction relative to the machine tool, and the retractable or telescopic cover elements may only be used to shield and cover and protect the unidirectional moving elements of the machine tool, but may not be used to shield and cover and protect the elements that are inclined relative to the machine tool.

U.S. Pat. No. 4,635,699 to Kauffman et al. discloses another typical retractable safety shield for machine tools also comprising a number of retractable or telescopic supporting members movably or retractably or foldably attached to a machine tool and for shielding and covering the machine tool.

However, similarly, the retractable or telescopic supporting members are moved only in one way or in one direction relative to the machine tool thus may only be used to shield and cover and protect the unidirectional moving elements of the machine tool, but may not be used to shield and cover and protect the elements that are inclined relative to the machine tool.

U.S. Pat. No. 5,199,926 to Hennig et al. discloses a further typical telescopic cover for machine tools also comprising a number of retractable or telescopic boxes movably or retractably or foldably attached to a machine tool and for shielding and covering the machine tool.

However, similarly, the retractable or telescopic boxes are moved only in one way or in one direction relative to the machine tool thus may only be used to shield and cover and protect the unidirectional moving elements of the machine tool, but may not be used to shield and cover and protect the elements that are inclined relative to the machine tool.

U.S. Pat. No. 5,127,140 to Oiwa et al. discloses a typical machine tool comprising one or more turrets or tool rests tilted or inclined relative to the machine tool. Due to the complicated parts or elements arranged or disposed in the machine tool, no telescopic safety shields or retractable safety covers may be attached to the machine tool for shielding and covering and protecting the machine tool.

The present invention has arisen to mitigate and/or obviate the afore-described disadvantages of the conventional telescopic safety shields or retractable safety covers.

SUMMARY OF THE INVENTION

The primary objective of the present invention is to provide a telescopic safety shield or retractable safety cover for attaching between two movable members or parts of a machine tool and for suitably shielding and covering the areas between the movable members or parts of the machine tool and for preventing dirt or contaminant from entering into the areas between the movable members or parts of the machine tool.

In accordance with one aspect of the invention, there is provided a telescopic safety shield device comprising a platform, a carrier movably engaged onto the platform, and including at least one guideway disposed on an upper portion of the carrier and tilted relative to the platform, a tool rest movably engaged onto the guideway of the carrier and moveable inclinedly relative to the carrier and the platform, a telescopic shielding device coupled between the platform and the tool rest and for shielding and covering an area between the platform and the tool rest, the telescopic shielding device including a first casing member and a second casing member, a first pivot coupling device pivotally coupling the first casing member of the telescopic shielding device to the platform, and a second pivot coupling device pivotally coupling the second casing member of the telescopic shielding device to the tool rest for allowing the first casing member and the second casing member of the telescopic shielding device to be pivoted relative to the platform and the tool rest respectively and for suitably shielding and covering the areas between the movable tool rest and the platform and for preventing dirt or contaminant from entering into the areas between the movable tool rest and the platform of the machine tool.

The first pivot coupling device includes at least one panel attached to the first casing member, and at least one flap pivotally coupled to the panel with a pivot shaft for allowing the flap to be pivoted relative to the panel, the flap is attached to the platform for allowing the first casing member to be pivoted relative to the platform. The platform includes a beam pivotally coupled to the flap of the first pivot coupling device.

The telescopic shielding device includes at least one third casing member slidably coupled between the first casing member and the second casing member. The third casing member includes a scraping device slidably engaged with the first casing member for wiping dirt off the first casing member. The second casing member may further include a wiping or scraping device slidably engaged with the third casing member for wiping dirt off the third casing member.

The second pivot coupling device includes at least one panel attached to the second casing member, and at least one flap pivotally coupled to the panel with a pivot shaft for allowing the flap to be pivoted relative to the panel, the flap is attached to the tool rest for allowing the second casing member to be pivoted relative to the tool rest. The tool rest includes a bottom pivotally coupled to the flap of the first pivot coupling device.

The carrier includes a safety covering device attached to the carrier for shielding and covering an area between the tool rest and the carrier. The safety covering device includes a frame secured to the carrier and a hood attached to the frame and located above the tool rest for shielding an upper portion of the tool rest. The hood is secured to the frame with at least one bar.

The safety covering device includes a cover attached to the tool rest, and a scraping device attached or secured to the hood and engaged with the cover of the tool rest and for scraping the dirt off the cover of the tool rest. The scraping device includes a plate secured to the hood and a wiper member engaged with the cover of the tool rest.

The carrier includes another covering device secured to the carrier for shielding and covering an area between the platform and the carrier. The first casing member and the second casing member each include a spacer for spacing purposes.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
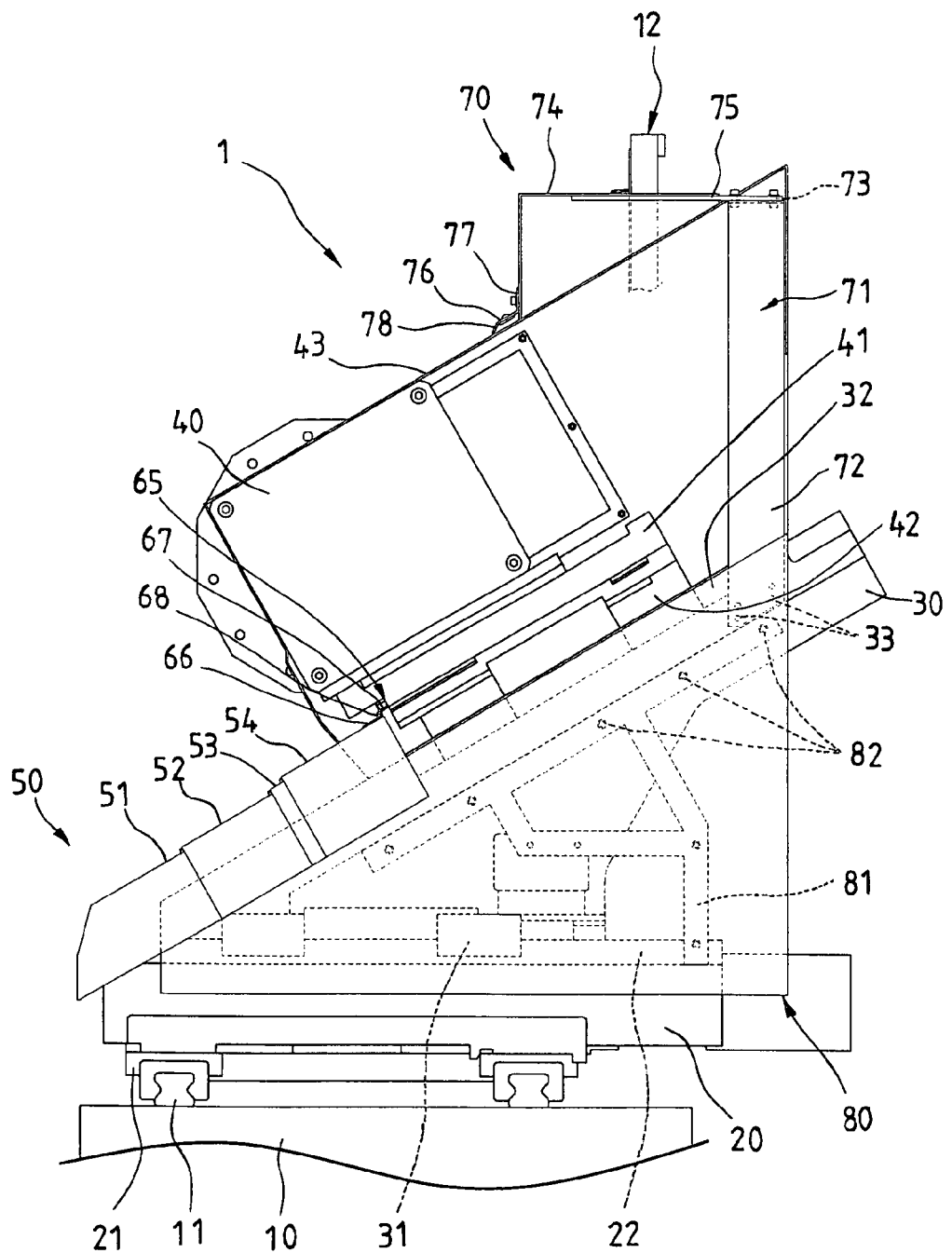
FIG. 1 is a partial plan schematic view of a telescopic safety shield for a machine tool in accordance with the present invention.

Referring to the drawings, and initially to FIGS. 1-6, a retractable safety cover or telescopic safety shield device 1 in accordance with the present invention is provided for attaching to a machine tool which comprises a bed or base 10 including one or more (such as two) rails 11 laterally and/or horizontally disposed or supported on the base 10, a platform 20 including one or more (such as two) couplers or brackets 21 slidably engaged onto the rails 11 respectively for allowing the platform 20 to be slid or moved laterally and/or horizontally relative to the base 10 in such as an X-axis, and the platform 20 further includes one or more (such as two) tracks 22 disposed or supported on the upper portion of the platform 20 for slidably supporting a carrier 30.

For example, the carrier 30 may include one or more (such as two) couplers or brackets 31 slidably engaged onto the tracks 22 respectively for allowing the carrier 30 to be slid or moved horizontally relative to the platform 20, the tracks 22 of the platform 20 are disposed or arranged perpendicular to the rails 11 of the base 10 such that the carrier 30 may slide or move in a direction perpendicular to the rails 11 of the base 10. The carrier 30 may include a substantially triangular structure as shown in FIGS. 1-3 and 6, and may include one or more (such as two) guideways 32 disposed or supported on the upper portion of the carrier 30 and tilted or inclined relative to the base 10 and the platform 20 for slidably supporting a turret or tool rest 40 for allowing the tool rest 40 to be slid or moved forwardly and downwardly or rearwardly and upwardly relative to the carrier 30 and the platform 20. The guideways 32 may be, but not necessarily be parallel to the tracks 22 of the platform 20, for example, the guideways 32 may be arranged inclined or perpendicular to the tracks 22 of the platform 20.

For example, the tool rest 40 may include one or more (such as two) couplers or brackets 42 attached to the bottom 41 thereof and slidably engaged onto the guideways 32 respectively for allowing the tool rest 40 to be slid or moved relative to the carrier 30 and along the guideways 32 of the carrier 30. A hood or cover 43 is disposed or attached to the outer portion and/or the upper portion of the tool rest 40 (FIGS. 1, 2) for shielding and covering the upper and the rear portion of the tool rest 40. The safety shield device 1 includes a telescopic shielding device 50 for attaching or coupling between the platform 20 and the tool rest 40 and for shielding and covering the front portion of the tool rest 40 or the area between the platform 20 and the tool rest 40, and a safety covering device 70 for attaching or coupling between the tool rest 40 and the carrier 30 and for shielding and covering the upper and the rear portion of the tool rest 40.

For example, the telescopic shielding device 50 of the safety shield device 1 includes a front or fixed or first cover box or casing member 51 for attaching or coupling to the platform 20, a rear or fixed or second cover box or casing member 54 for attaching or coupling to the tool rest 40, and one or more (such as two) further or middle or slidable or third cover box or casing member 52, 53 slidably coupled between the front or first casing member 51 and the rear or second casing member 54 and for forming the telescopic or retractable structure to the telescopic shielding device 50. It is preferable that the front or first casing member 51 is slidably engaged within the middle or slidable casing member 52, 53 which is then slidably engaged within the rear or second casing member 54.

It is further preferable that the telescopic shielding device 50 includes a wiper or scraping device 55 (FIG. 1) disposed or attached to each of the middle or slidable casing member 52, 53 and the rear or second casing member 54 for slidably or movably engaging with the front or first casing member 51 and the middle or slidable casing member 52, 53 respectively and for wiping or scraping the dirt or contaminant or chips off the telescopic shielding device 50, and the telescopic shielding device 50 further includes a pad or spacer 56 (FIG. 1) disposed or attached to each of the middle or slidable casing member 52, 53 and the front or first casing member 51, and for selectively engaging with the tool rest 40 and/or the rear or second casing member 54 and the middle or slidable casing member 52, 53 respectively, for limiting the casing members 51-54 to move relative to each other or for suitably spacing the casing members 51-54 from each other.

Figure 2:
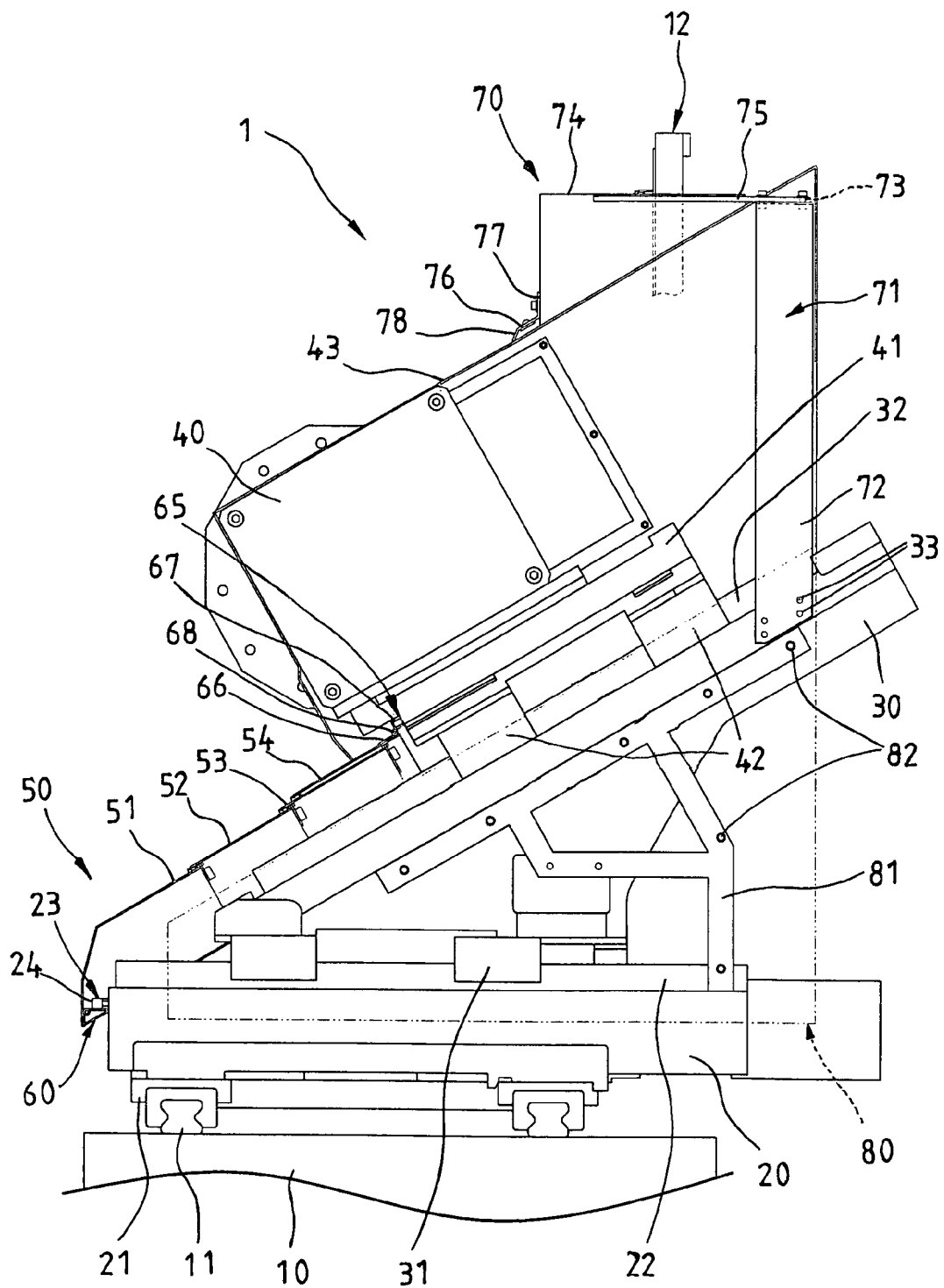
FIG. 2 is a partial plan schematic view similar to FIG. 1, in which a portion of the machine tool has been removed for showing an inner structure of the machine tool.
Figure 3:
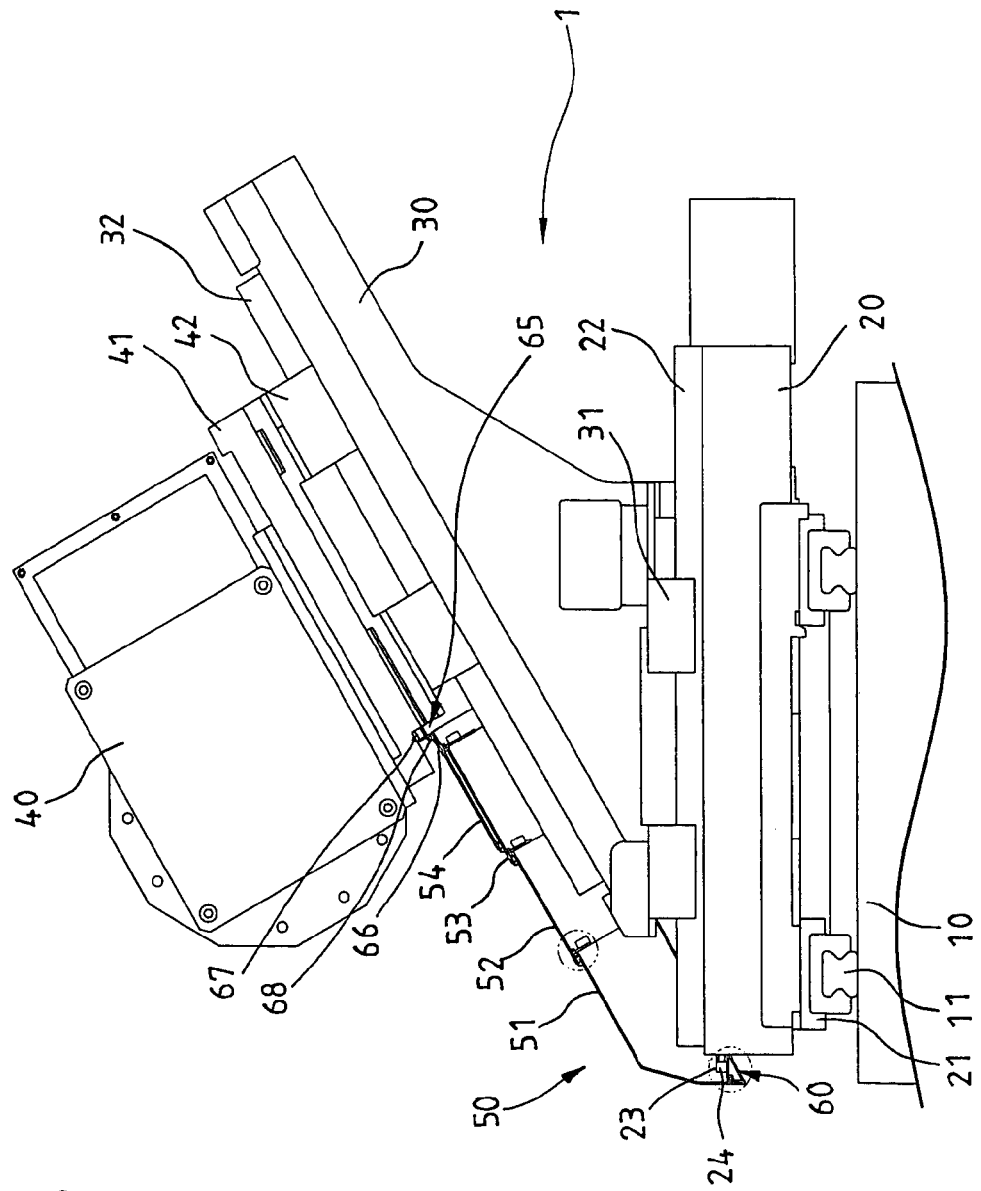
FIG. 3 is a partial plan schematic view similar to FIGS. 1 and 2, in which another portion of the machine tool has further been removed for showing an inner structure of the machine tool.
Figure 5:
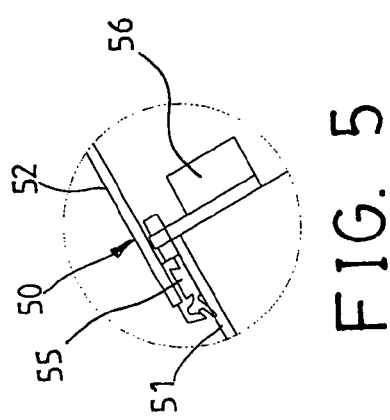
FIGS. 4, 5 are enlarged partial plan schematic views for showing different portions of the telescopic safety shield for the machine tool.
Figure 4:
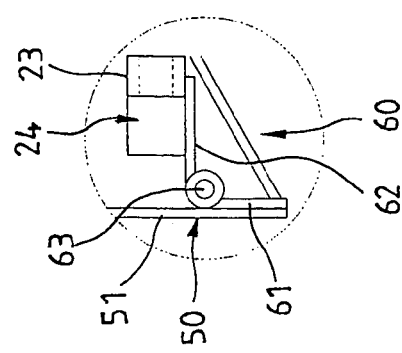
Figure 6:
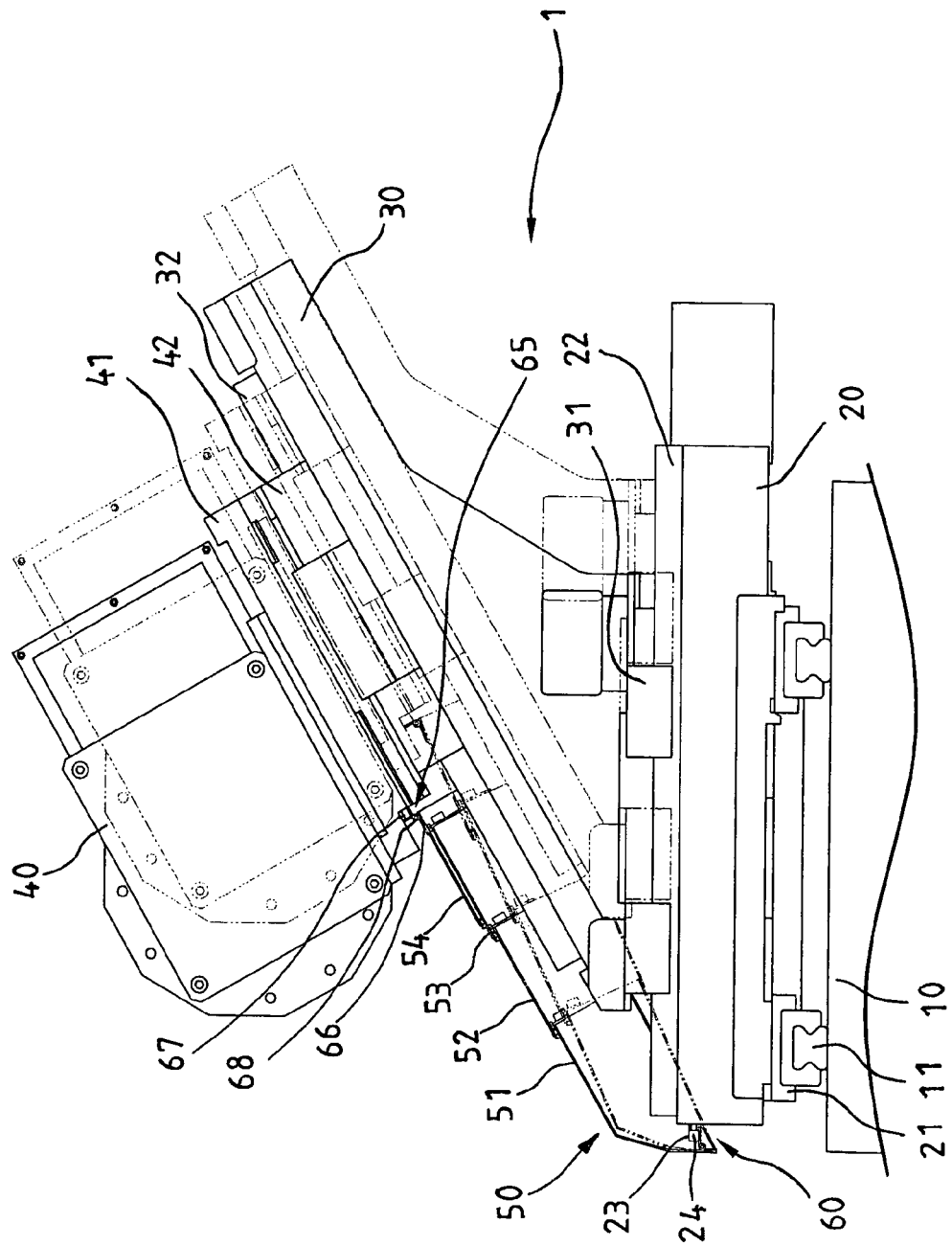
FIG. 6 is a partial plan schematic view similar to FIGS. 1-3, illustrating the operation of the telescopic safety shield for the machine tool.

As shown in FIGS. 3, 4, 6, the platform 20 includes a beam 23 disposed or attached to the front portion 24 of the platform 20 for pivotally coupling to the front or first casing member 51 of the telescopic shielding device 50 with a pivot coupling device 60. As best shown in FIGS. 2-4 and 6-7, the pivot coupling device 60 includes one or more panels 61 attached or secured to the front or first casing member 51 with such as fasteners or latches (not shown), or with adhesive materials, or by welding processes, or the like, and includes one or more flaps 62 pivotally coupled to the panels 61 with pivot shafts 63 respectively for allowing the flaps 62 to be pivoted or rotated relative to the panels 61. The flaps 62 may be attached or coupled or secured to the beam 23 or the platform 20 with such as rivets or fasteners or latches (not shown), or with adhesive materials, or by welding processes, or the like, and thus for allowing the front or first casing member 51 of the telescopic shielding device 50 to be pivoted or rotated relative to the platform 20 (FIG. 6).

As shown in FIGS. 1-3 and 6, another pivot coupling device 65 may be provided for pivotally coupling the rear or second casing member 54 of the telescopic shielding device 50 to the tool rest 40, and includes one or more panels 66 attached or secured to the rear or second casing member 54 with such as fasteners or latches (not shown), or with adhesive materials, or by welding processes, or the like, and includes one or more flaps 67 pivotally coupled to the panels 66 with pivot shafts 68 respectively for allowing the flaps 67 to be pivoted or rotated relative to the panels 66. The flaps 67 may be attached or secured to the bottom 41 of the tool rest 40 with such as rivets or fasteners or latches (not shown), or with adhesive materials, or by welding processes, or the like, and thus for allowing the rear or second casing member 54 of the telescopic shielding device 50 to be pivoted or rotated relative to the tool rest 40 (FIG. 6).

Figures 7, 8:
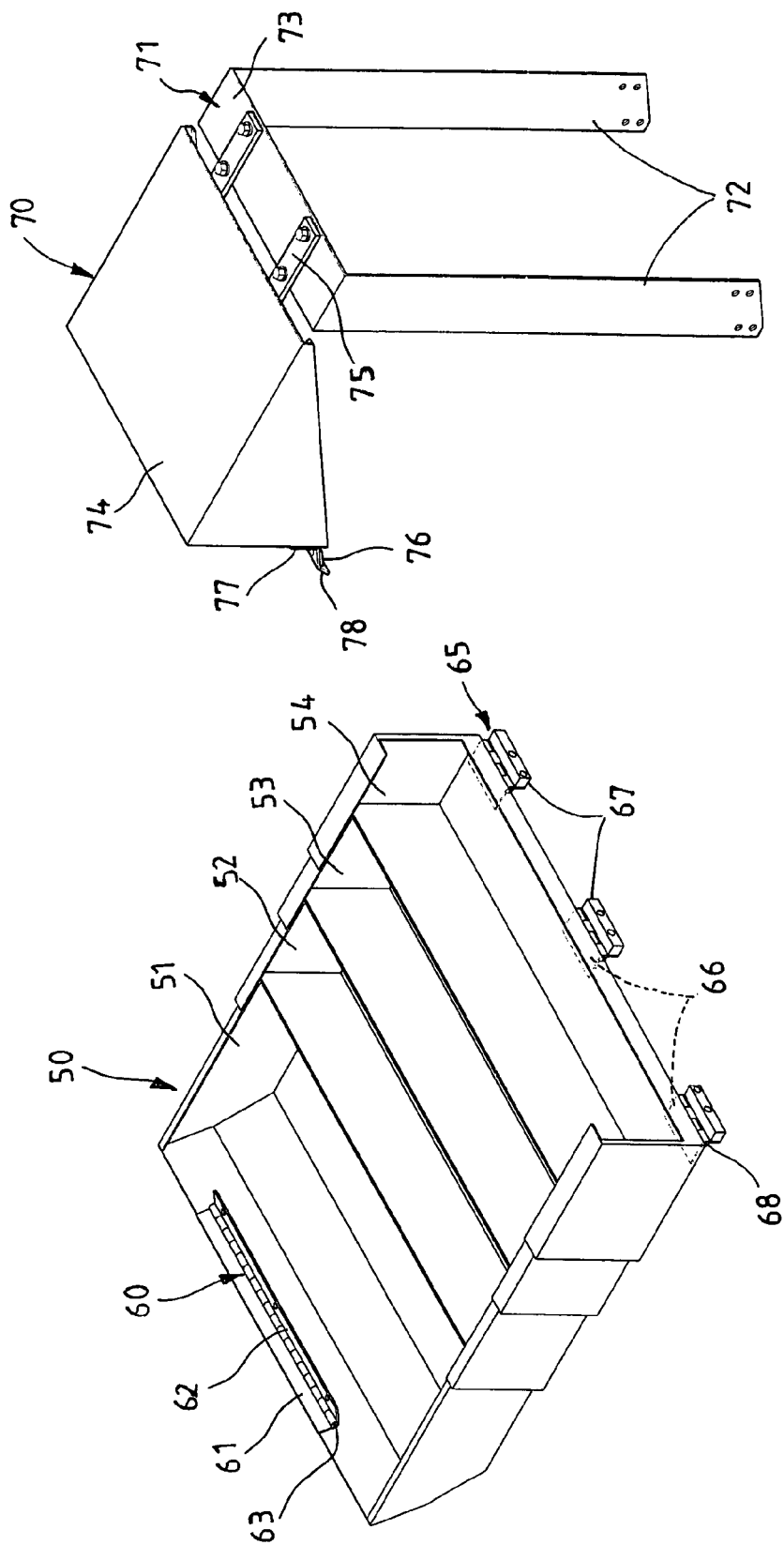
FIG. 7 is a bottom perspective view illustrating one of the telescopic safety shields for the machine tool.
FIG. 8 is a perspective view illustrating the other telescopic safety shield for the machine tool.

The covering device 70 is provided for attaching or coupling between the tool rest 40 and the carrier 30 and for shielding and covering the upper and the rear portion of the tool rest 40. As shown in FIGS. 1-2 and 8, the covering device 70 includes a bracket or frame 71 having an inverted U-shaped structure and having two legs 72 extended or dependent downwardly from an upper wall 73 and attached or secured to the carrier 30 with such as fasteners or latches 33, and includes a hood 74 attached or secured to the upper wall 73 of the frame 71 with one or more (such as two) bars 75 and located above the cover 43 of the tool rest 40 for covering or shielding an upper portion of the tool rest 40, and includes another wiper or scraping device 76 which has a plate 77 attached or secured to the hood 74 and which has a soft or resilient wiper member 78 for slidably or movably engaging with the cover 43 of the tool rest 40 and for wiping or scraping the dirt or contaminant or chips off the cover 43 of the tool rest 40. The hood 74 may further be attached or secured to a column 12 of the base 10.

As shown in FIGS. 1-2, another covering device 80 may further be provided and attached or disposed or secured between the platform 20 and the carrier 30 and for shielding and covering the area or the intermediate portion between the platform 20 and the carrier 30. For example, the covering device 80 may include two boards 81 attached or secured to the two side portions the platform 20 or to the carrier 30 with such as latches or fasteners 82 in order to suitably shield and cover the area or the intermediate portion between the platform 20 and the carrier 30, such that the adjacent areas or portions between the platform 20 and the carrier 30 and the tool rest 40 may be suitably shielded and covered or protected by the telescopic shielding device 50 and the covering devices 70, 80 of the safety shield device 1.

In operation, as shown in FIG. 6, the carrier 30 may be slid or moved along the tracks 22 of the platform 20 or the carrier 30 may be moved forwardly and rearwardly relative to the platform 20 and the base 10 as shown in solid lines and in dotted lines respectively, and the tool rest 40 may be slid or moved forwardly and downwardly or rearwardly and upwardly or inclinedly relative to the carrier 30 and the platform 20, such that the front or first casing member 51 and the rear or second casing member 54 of the telescopic shielding device 50 may be slightly pivoted or rotated relative to the platform 20 and the tool rest 40, and the pivot coupling devices 60, 65 may be provided for allowing the telescopic shielding device 50 to be pivoted or rotated relative to the platform 20 and the tool rest 40 respectively, and for allowing the tool rest 40 to be suitably slid or moved relative to the carrier 30, and for allowing the environment or side areas of the tool rest 40 to be suitably shielded and covered or protected by the telescopic shielding device 50 and the covering devices 70, 80 of the safety shield device 1.

Accordingly, the telescopic safety shield device in accordance with the present invention may be provided for attaching between two movable members or parts of a machine tool and for suitably shielding and covering the areas between the movable members or parts of the machine tool and for preventing dirt or contaminant from entering into the areas between the movable members or parts of the machine tool.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A telescopic safety shield device comprising:
    a platform,
    a carrier movably engaged onto said platform, and including at least one guideway disposed on an upper portion of said carrier and tilted relative to said platform,
    a tool rest movably engaged onto said at least one guideway of said carrier and moveable inclinedly relative to said carrier and said platform,
    a telescopic shielding device coupled between said platform and said tool rest and for shielding and covering an area between said platform and said tool rest, said telescopic shielding device including a first casing member and a second casing member,
    a first pivot coupling device pivotally coupling said first casing member of said telescopic shielding device to said platform, and
    a second pivot coupling device pivotally coupling said second casing member of said telescopic shielding device to said tool rest for allowing said first casing member and said second casing member of said telescopic shielding device to be pivoted relative to said platform and said tool rest respectively.

2. The telescopic safety shield device as claimed in claim 1, wherein said first pivot coupling device includes at least one panel attached to said first casing member, and at least one flap pivotally coupled to said at least one panel with a pivot shaft for allowing said at least one flap to be pivoted relative to said at least one panel, said at least one flap is attached to said platform for allowing said first casing member to be pivoted relative to said platform.

3. The telescopic safety shield device as claimed in claim 2, wherein said platform includes a beam pivotally coupled to said at least one flap of said first pivot coupling device.

4. The telescopic safety shield device as claimed in claim 1, wherein said telescopic shielding device includes at least one third casing member slidably coupled between said first casing member and said second casing member.

5. The telescopic safety shield device as claimed in claim 4, wherein said at least one third casing member includes a scraping device slidably engaged with said first casing member for wiping dirt off said first casing member.

6. The telescopic safety shield device as claimed in claim 4, wherein said second casing member includes a scraping device slidably engaged with said at least one third casing member for wiping dirt off said at least one third casing member.

7. The telescopic safety shield device as claimed in claim 1, wherein said second pivot coupling device includes at least one panel attached to said second casing member, and at least one flap pivotally coupled to said at least one panel with a pivot shaft for allowing said at least one flap to be pivoted relative to said at least one panel, said at least one flap is attached to said tool rest for allowing said second casing member to be pivoted relative to said tool rest.

8. The telescopic safety shield device as claimed in claim 7, wherein said tool rest includes a bottom pivotally coupled to said at least one flap of said first pivot coupling device.

9. The telescopic safety shield device as claimed in claim 1, wherein said carrier includes a safety covering device attached to said carrier for shielding and covering an area between said tool rest and said carrier.

10. The telescopic safety shield device as claimed in claim 9, wherein said safety covering device includes a frame secured to said carrier and a hood attached to said frame and located above said tool rest for shielding an upper portion of said tool rest.

11. The telescopic safety shield device as claimed in claim 10, wherein said hood is secured to said frame with at least one bar.

12. The telescopic safety shield device as claimed in claim 10, wherein said safety covering device includes a cover attached to said tool rest, and a scraping device attached to said hood and engaged with said cover of said tool rest and for scraping a dirt off said cover of said tool rest.

13. The telescopic safety shield device as claimed in claim 12, wherein said scraping device includes a plate secured to said hood and a wiper member engaged with said cover of said tool rest.

14. The telescopic safety shield device as claimed in claim 1, wherein said carrier includes a covering device secured to said carrier for shielding and covering an area between said platform and said carrier.

15. The telescopic safety shield device as claimed in claim 1, wherein said first casing member and said second casing member each include a spacer for spacing purposes.

* * * * *